United States Patent
Dorfan

(10) Patent No.: US 10,120,062 B1
(45) Date of Patent: *Nov. 6, 2018

(54) METHOD FOR TRANSMITTING AND RECEIVING RADAR SIGNALS WHILE BLOCKING RECEPTION OF SELF GENERATED SIGNALS

(71) Applicant: ANADYNE, INC, Santa Cruz, CA (US)

(72) Inventor: David Elliot Dorfan, Santa Cruz, CA (US)

(73) Assignee: ANADYNE, INC., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/545,400

(22) Filed: Apr. 30, 2015

Related U.S. Application Data

(63) Continuation-in-part of application No. 13/506,584, filed on Apr. 30, 2012.

(51) Int. Cl.
*G01S 13/00* (2006.01)
*H01Q 3/40* (2006.01)
*G01S 7/02* (2006.01)

(52) U.S. Cl.
CPC ............ *G01S 7/023* (2013.01); *H01Q 3/40* (2013.01); *G01S 13/00* (2013.01)

(58) Field of Classification Search
CPC .. H01P 1/184; H01Q 3/26; H01Q 3/40; G01S 13/00
USPC ....................................... 342/198, 159, 175
See application file for complete search history.

(56) References Cited

U.S. PATENT DOCUMENTS

| | | | |
|---|---|---|---|
| 3,883,870 A * | 5/1975 | Kunz | 342/174 |
| 3,916,408 A * | 10/1975 | Evans | G01S 7/2813 342/159 |
| 4,675,678 A * | 6/1987 | Klingenschmitt et al. | 342/34 |
| 4,878,251 A * | 10/1989 | Richardson | H03D 3/002 455/206 |
| 6,792,250 B1 * | 9/2004 | Zarubin | H04B 1/0475 327/105 |
| 6,864,837 B2 * | 3/2005 | Runyon et al. | 342/372 |
| 7,336,220 B2 * | 2/2008 | Stewart | G01S 7/34 342/159 |

(Continued)

FOREIGN PATENT DOCUMENTS

WO   WO 2013015829 A1 *   1/2013

*Primary Examiner* — Marcus E Windrich
(74) *Attorney, Agent, or Firm* — Jeffrey Hall

(57) ABSTRACT

A method and apparatus which enables a facility or entity such as ships, airplanes, and land based sites, that transmits and receives radar signals to receive any incoming radar signal, while blocking reception of any signals generated by the facility or entity itself. The method comprises transmitting a primary signal from an rf generator; providing a second signal which is synchronized with the primary signal matching in both phase and amplitude, but with a phase difference of 180 degrees so that the two signals sum to zero. The second signal travels through a voltage controlled attenuator and thru a voltage controlled phase shifter. Combining in a combiner the second signal with a signal radiated by a transmitting antenna and received by a receiving antenna that connects into a transmission enabling mechanism, and then transmitting the combined signal to a detector apparatus.

19 Claims, 3 Drawing Sheets

(56) References Cited

U.S. PATENT DOCUMENTS

| | | | |
|---|---|---|---|
| 7,450,066 B2* | 11/2008 | Haskell | H01Q 1/246 342/368 |
| 8,203,484 B2* | 6/2012 | Chu | H01Q 3/2682 342/375 |
| 8,502,622 B2* | 8/2013 | Hein et al. | 333/136 |
| 2003/0090416 A1* | 5/2003 | Howell et al. | 342/359 |
| 2005/0219096 A1* | 10/2005 | Freeman et al. | 341/143 |
| 2012/0235768 A1* | 9/2012 | Hein | H01P 1/184 333/136 |
| 2013/0027117 A1* | 1/2013 | Dorfan | 327/513 |

* cited by examiner

TYPICAL PRIOR RADAR RECEIVING SETUP

PRIOR TUNNEL DIODE DETECTOR SETUP

METHOD FOR TRANSMITTING AND RECEIVING RADAR SIGNALS WHILE BLOCKING RECEPTION OF SELF GENERATED SIGNALS

CROSS REFERENCE TO RELATED APPLICATIONS

This application is a continuation-in-part of and claims priority from co-pending U.S. patent application Ser. No. 13/506,584 filed Apr. 30, 2012, which is related to and claims priority from U.S. Provisional Patent Application 61/574,258, filed Jul. 28, 2011.

BACKGROUND OF THE INVENTION

Technical Field

This invention relates to methods and apparatuses that enable a facility or entity that transmits and receives radar signals over a broad frequency range, spanning at least three octaves to receive any incoming signals, while blocking reception of any signals generated by the facility or entity itself.

Background Art

Many facilities or entities, such as ships, airplanes and land based sites need to transmit and receive signals, such as radar signals, simultaneously. This can present serious difficulties since the receiving antennas will often pick up very large signals from the transmitting antennas owing to their close proximity. These signals will mask the incoming signals as described below.

The transmitted and received signals may be continuous, rf signals (CW), or pulsed. The rf frequencies are usually in the range of 500 Mhz to 30 GHz, and the pulse durations are long compared to a single rf cycle. The rf is generally acting as a carrier for the pulses.

The signals detected by the receiving antennas are taken through cables from the antennas to detectors and may pass through filters, rf amplifiers, limiters, isolators impedance matching networks, and the like. A typical setup is shown in FIG. 1(a). The detectors are usually tunnel, or Schottky, diodes with an inductor to ground on the input side and a capacitor to ground on the output side. The inductor provides a DC path to ground for low frequency components, while the capacitor serves to run rf signals to ground after they have been through the detector. The diodes themselves act as "power law" detectors, producing a DC offset proportional to the rf power input on the capacitor side of the detector for CW rf inputs and a pulse with a pulse height proportional to the rf power for received signals which are pulse modulated rf. The DC signal, or demodulated pulses are then amplified by video amplifiers and the information carried by them processed by subsequent electronic circuitry. The detectors produce an output that is proportional to the input power up to the input power of about −20 dbm. For higher input powers the response is less sensitive, and for powers above about 5 dbm, tunnel diodes behave poorly and can be destroyed very easily. Schottky diodes can take higher powers than tunnel diodes without being destroyed, but their sensitivity is also seriously degraded for high power input signals.

If the receiving system is only intended to detect pulses and CW is also present, either from an external source or from the transmitting antennas, it is possible to strip this CW, while maintaining the ability to see and measure the amplitude of short pulses, by using filtering techniques, or "baseline restorers" in the video circuitry that follows the detector, provided that the incoming power is low enough so the detector's sensitivity is not degraded, that is, for rf powers below about −20 dbm. For higher powers it may be still be possible to see and measure the amplitude of pulses accurately provided the power of the rf carrier for the pulses is larger than the power of the CW that is being stripped. However, the loss of sensitivity of the detectors makes it impossible to see small incoming pulses that could be seen in the absence of the CW. In addition, for high input powers of CW, inner modulation noise becomes a serious problem and this further masks the small input signals. The inner modulation noise results from the non linear nature of the detector. Because its output is proportional to the square of the amplitude, if two frequencies are present in the rf, the output of the detector will have one term with a frequency equal to the sum of the frequencies, and another with the difference of the frequencies. Since there is always white rf noise, the difference frequency between the large signal rf received and that of some of the noise will fall directly into the video band, giving rise to the inner modulation noise. Finally, it is not possible to detect and measure pulse amplitudes accurately if the carrier frequency is close to that of the unwanted incoming CW, its subharmonics or harmonics, because of interference effects in the rf. In spite of these problems all of the efforts we are aware of have attempted to strip CW in the video section, after the signal has been detected, or have used many channels, each one with its own detector with channels having narrow filters. With this latter approach all channels except the channel that receives and passes the transmitted signal are live to incoming radar. This is expensive and does not permit reception in the same band that is being used to transmit. Note that incoming signals or CW from distant sources are usually relatively weak so that the detectors are not crippled by these signals. The high power signals that are generally the problem are those generated by the facility's, or entity's own transmitting antennas.

The only way to prevent these problems is to stop the unwanted signal from reaching the detector and a method and apparatus for achieving this is the object and advantage of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objectives, and in accordance with the purpose of the invention as embodied and broadly described herein, the present invention is premised on the fact that the facility or entity knows the amplitude and phase of the signals they transmit. Thus if a signal that is derived from the same signal generator, or one synchronized with it in phase, frequency and amplitude is taken along a second path to the detector, with the signal taken via the secondary path arriving at the detector with the same amplitude as the signal arising from the primary path, but with a phase difference of 180 degrees, the two signals sum to zero. The primary path is the path described above, namely through the transmitting and receiving antennas. The secondary path could be through a cable or wave guide, separate antenna or other means well known in the art, which is fed by diverting some of the signal that goes to the transmitting antenna to the secondary path, and then added to the primary signal at a point after the receiving antenna and before the detector. The secondary signal has its amplitude and phase adjusted to cancel the primary signal. This is preferably achieved by voltage controlled attenuators and phase shifters or by increasing the path length for the secondary signal by changing the physical length of cable, using switches, or a variable length device like a trombone.

BRIEF DESCRIPTION OF DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE PREFERRED EMBODIMENTS

Reference will now be made in detail to the present preferred embodiments of the invention as illustrated in the accompanying drawings.

Figure 2:
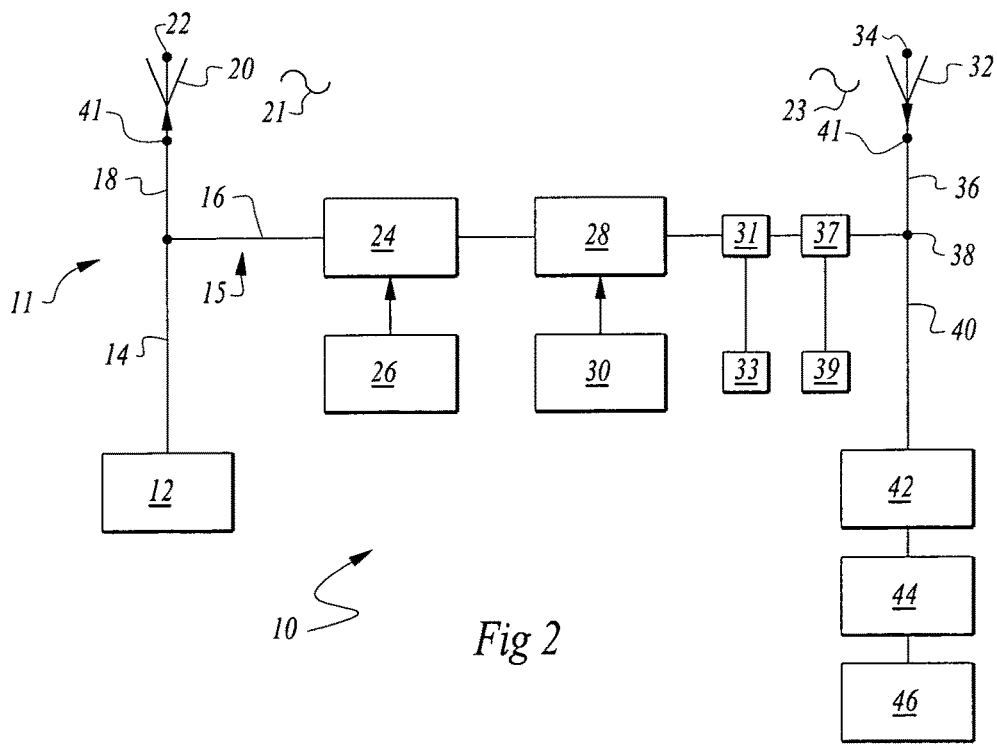
FIG. 2 shows a preferred embodiment of the invention which enables a facility or entity that transmits and receives radar signals to receive any incoming radar signal, while blocking reception of any signals generated by the facility itself, according to the invention.
Figure 3:
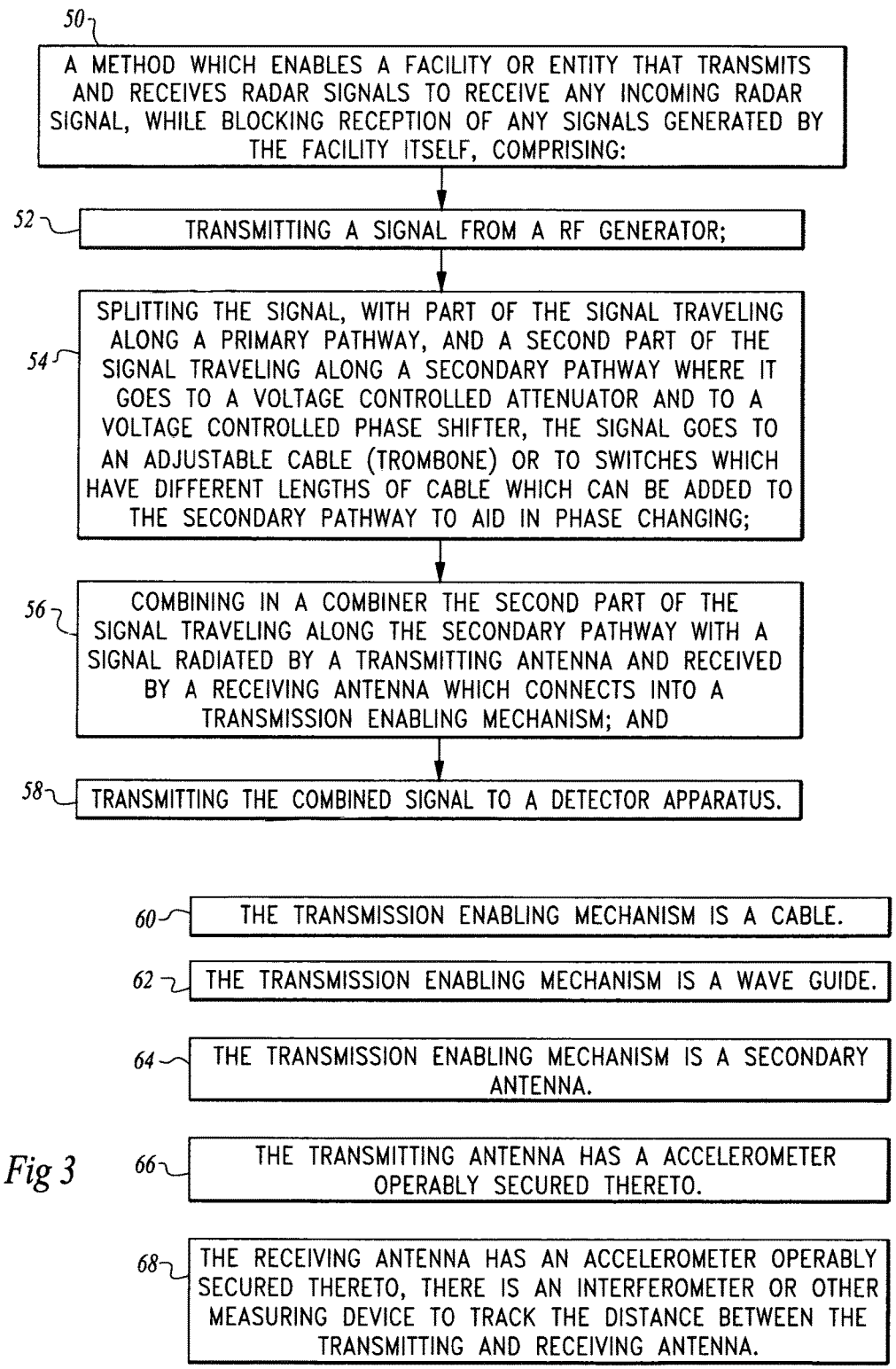
FIG. 3 is flow diagram of a preferred method which enables a facility or entity that transmits and receives radar signals to receive any incoming radar signal, while blocking reception of any signals generated by the facility itself, according to the invention.
Figure 4:
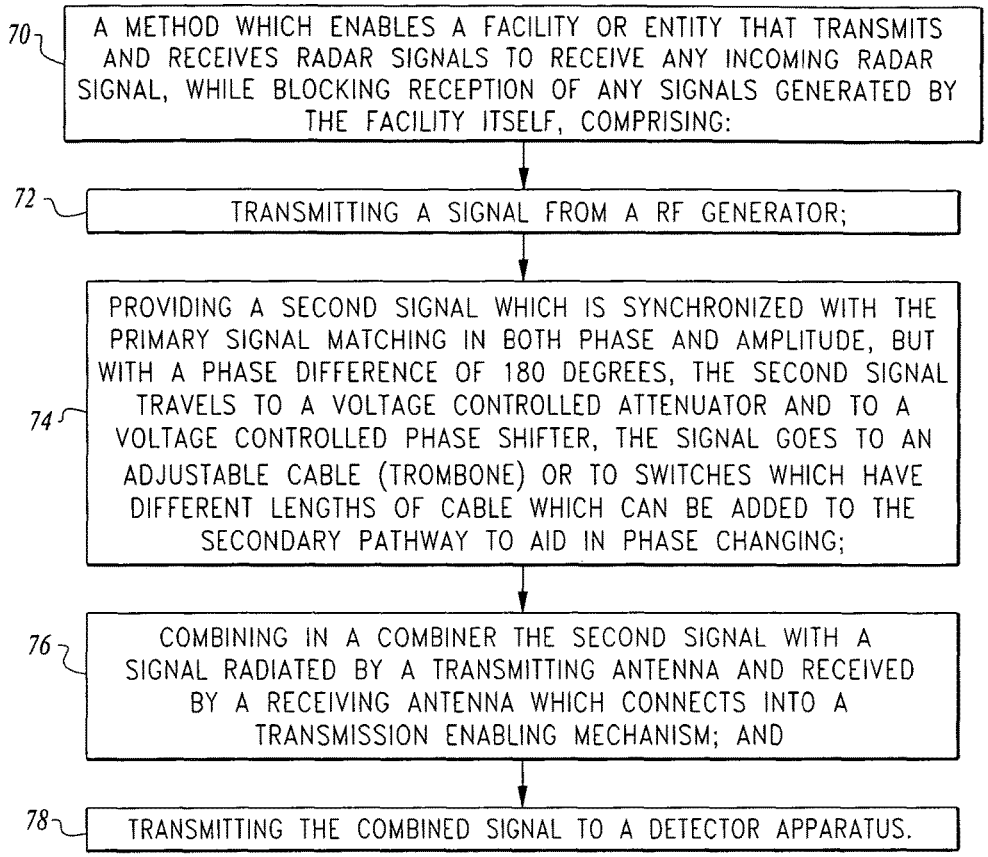
FIG. 4 is flow diagram of another preferred method which enables a facility or entity that transmits and receives radar signals to receive any incoming radar signal, while blocking reception of any signals generated by the facility itself, according to the invention

The preferred embodiments of the present invention, described herein and illustrated in the drawings, in particular FIGS. 2, 3 and 4, provide for the first time, a method and apparatus 10, which enables a facility or entity that transmits and receives radar signals to receive any incoming radar signal, while blocking reception of any signals generated by the facility itself. In all of the embodiments a method and apparatus, constructed using components which are well known in the microwave, or rf, field, is employed to do the following:

Transmit a primary signal generated by a rf generator from a primary transmitting antenna.

Derive a secondary signal whose frequency is the same as that of the primary signal, whose amplitude is related to that of the primary signal, preferably linearly, whose phase maintains a constant difference, which may be zero, from that of the primary. This signal must be contained so that it does not get transmitted from the primary transmitting antenna and does not propagate beyond a small area close to the receiving antenna. This is most simply achieved by splitting off a fraction of the primary signal before it is transmitted and transporting it separately. However, it could be derived from a second generator which is synchronized in frequency, phase and amplitude with the first generator.

This secondary signal will be added to the primary signal before the primary signal reaches the detector which follows the receiving antenna. Adjustments are made to the secondary beam as described below so that when the signals are combined the amplitudes of the secondary and primary signals are the same but the phase of the secondary signal differs from that of the primary by 180 degrees, so that the two signals sum to zero. The combination or summation can take place at the receiving antenna if the transport means for the second signal includes a secondary transmission antenna and shielding which keeps the signal localized to the vicinity of the receiving antenna. The simplest implementation of the summation would be to couple a cable carrying the secondary signal into a cable used to transport the signal from the receiving antenna to the detector.

In order to achieve the phase and amplitude relations between the primary, and secondary, beams described above, the secondary beam is taken through a voltage controlled attenuator and a voltage controlled phase shifter. The control voltages for these devices come from a computer in which data derived in calibration runs, temperature as well as data pertaining to the distance between the transmitting, and receiving antennas is stored. The distance data can be obtained and fed to a computer by using an interferometer to measure the distance between the two antenna. This distance may change because of wind, temperature or other variables, but the time scales for meaningful distance changes is at least milliseconds, so this is easily monitored and fed into the system. The phase can also be changed using a variable length cable. Or by switching a coaxial switch to bring in cables of various lengths, although this would still need a phase shifter to get sufficient precision.

The sum of the two signals is transported from the combiner to the detector. The transmitted signal and the secondary signal should sum to zero but any other signal coming in at the same time will proceed to the detector unaltered.

Figure 1A:
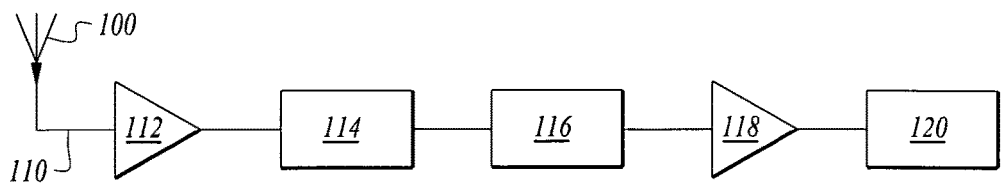
FIG. 1(a) shows a prior radar signal receiving setup, as typical in the prior art, and shown here for illustrative purposes.
Figure 1B:
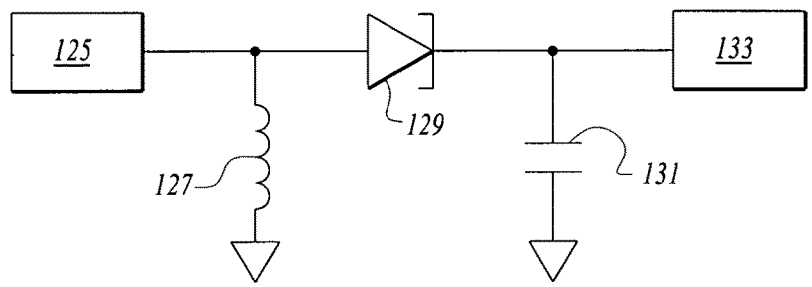
FIG. 1(b) shows a prior art tunnel diode detector setup, for illustrative purposes.

First, in reference to FIGS. 1(a) and 1(b) examples of typical prior radar receiving and detector setups are shown for illustrative purpose and their operation described in the Background section of this application. In FIG. 1(a) a receiving antenna 100, is shown linked by cable 110, to rf amplifier 112 and to filters 114, limiters, or isolaters and the like, to a detector apparatus 116. The signal travels to amplifier 118 and to signal processing 120.

In FIG. 1(b) shows an example of a prior tunnel diode detector setup, for illustrative purposes. Here, rf signal 125, travels to inductor 127, and then to tunnel diode 129, linked to capacitor 131, and to video section 133.

With reference now to FIG. 2, a preferred embodiment of the present invention is shown 10, with rf generator 12 linked to cable 14. Cable 14, is linked to cable 18 which is communicatively linked to transmitting antenna 20, with transmitting signal 21. This defines a primary signal pathway 11. In accordance with the invention, the signal traveling up cable 14, from rf generator 12, is split, with part going to transmitting antenna 20, via cable 18, and part being diverted along cable 16, where it goes into a voltage controlled attenuator 24, with control means 26, which may be a computer or other control device to control voltage in attenuator 24. The diverted signal then travels to voltage controlled phase shifter 28, with control means 30, which may be a computer or other control device to control voltage in voltage shifter 28, and to adjust the phase shifter in response to data received from accelerometers or an interferometric distance measuring apparatus, such as interferometer 41, on the antennas, to measure distance between antennas. The interferometer 41, or other measuring device is used to track the distance between the transmitting and receiving antenna. The signal is then combined with the signal 23, received by receiving antenna 32, which connects into cable 36. The signal can also go through to an adjustable length cable (trombone) 31, with a control means 33, which may be a digital, wireless, or mechanical control device, which controls the length of the cable. The path length of the secondary signal can also be changed, if required, by means of a coaxial switch 37, which connects different lengths of cable into the secondary signal pathway. The coaxial switch is controlled by control means 39, which may be a digital, wireless, or mechanical control device. Together with the voltage controlled phase shifter 28, this enables the phase to be adjusted to null the unwanted signal reaching the detector. This is the secondary signal pathway 15.

In FIG. 2 a single diverting or canceling path is shown, however, in alternative embodiments, more canceling paths along cables in parallel with cable 16, could be used instead of the single path illustrated. This would enable the facility to transmit more than one frequency at a time. Each frequency signal would require its own canceling secondary signal.

Alternative means for diverting the signal path may also be used, such as wave guides 58, in FIG. 3, and 82, of FIG. 4, or secondary antennas 64, in FIG. 3 and 84, FIG. 4. In the preferred embodiment, an accelerometer or accelerometer chip 22, on transmitting antenna 20, and accelerometer or accelerometer chip 34, or an interferometric distance measuring apparatus such as interferometer 41, on receiving antenna 32, are used to track relative movement of the antennas and this data is fed into control system 30, of phase shifter 28, where it is used to adjust the phase shifter as required. The signals are combined in a combiner 38, which receive signals through cable 16 and 36, and which connects into a transmission enabling mechanism, such as cable 40, and transmits the combined signal to filters 42, or rfamps, isolators, and the like well known in the art, then to detector 44, and after demodulation to video 46.

Preferably, the method and apparatus described herein for which enables a facility or entity that transmits and receives radar signals to receive any incoming radar signal, while blocking reception of any signals generated by the facility itself, is calibrated in the absence of any other incoming signals at each frequency that is transmitted. The attenuation and phase shift adjustments would automatically set to the calibrated values when transmitting. Since both paths are fed by the same generator, namely rf generator 12, the cancellation will work for all amplitudes, provided that they are set correctly at some amplitude. The system can also be calibrated by transmitting a very powerful signal that swamps any incoming signals from other sources, and nulling this signal as well as possible using attenuator 24, and phase shifter 28.

In practice, antennas 20, and 32, may move relative to each other because of vibrations or wind and thus the path difference would change and the signals would no longer cancel. The time scale for this movement is milliseconds and the relative movement could be tracked using accelerometer chips 22, and 34, on antennas 20, and 32, and corrected for by changing the phase shift accordingly. Alternatively, a separate system which measures the distance between the antennas could be installed an its reading used to adjust the phase.

It is also advantageous to make the actual path difference between the two paths a close to zero as possible because the transmitted signal has a finite bandwidth $\Delta f$.

Making the path lengths equal is not be possible if there are multiple paths for the radiation transmitted by one antenna and received by a second antenna. This could be the case if the signal detected results from reflections, rather than direct transmission from one antenna to the other. If this is the case, the power spectrum detected for the unwanted signals will differ from the power spectrum that is generated. In this case it is clear that the signal used to cancel the unwanted signal will not cancel it completely since all the paths will not have the same phase at the receiving antenna. If there are a small number of significant paths, then the unwanted signal can still be canceled by using a separate canceling signal for each path.

With reference now to FIG. 3, a preferred method 50, of the present invention is illustrated in a flow diagram, which enables a facility or entity that transmits and receives radar signals to receive any incoming radar signal, while blocking reception of any signals generated by the facility itself, comprises the steps of: transmitting a signal by an rf generator 52; splitting the signal, with part of the signal traveling along a primary pathway, and a second part of the signal traveling along a secondary pathway where it goes to a voltage controlled attenuator and to a voltage controlled phase shifter, 54, the signal then goes to an adjustable length cable or trombone 31, as seen in FIG. 3, or to switches which have different lengths of cable which can be added to the secondary pathway to aid in phase changing; combining in a combiner the second part of the signal traveling along said secondary pathway with a signal radiated by a transmitting antenna and received by a receiving antenna which connects into a transmission enabling mechanism, 56; and then transmitting the combined signal to a detector apparatus, step 58. In FIG. 3, the transmission enabling mechanism is a cable 60, or a wave guide 62, or a secondary antenna 64, or plurality of antennas. In FIG. 3, the transmitting antenna preferably has an accelerometer operably secured thereto, 66, and the receiving antenna also has an accelerometer operably secured thereto, 68, there is also provided interferometer 41, seen in FIG. 2, or other measuring device to track the distance between the transmitting and receiving antenna In FIG. 4, another preferred method 70, is shown, which enables a facility or entity that transmits and receives radar signals to receive any incoming radar signal, while blocking reception of any signals generated by the facility itself, comprises the steps of: transmitting a primary signal by an rf generator, 72; providing a second signal which is synchronized with the primary signal matching in both phase and amplitude, but with a phase difference of 180 degrees, the second signal travels to a voltage controlled attenuator and to a voltage controlled phase shifter, 74, the signal then goes to an adjustable length cable or trombone 31, as seen in FIG. 2, or to switches which have different lengths of cable which can be added to the secondary pathway to aid in phase changing; combining in a combiner the second signal with a signal radiated by a transmitting antenna and received by a receiving antenna which connects into a transmission enabling mechanism 76; and transmitting the combined signal to a detector apparatus 78. In FIG. 4, the transmission enabling mechanism is a cable 80, or a wave guide 82, or a secondary antenna 84. Preferably the transmitting antenna has an accelerometer, or an interferometric distance measuring apparatus to measure distance between antennas operably secured thereto, 86, and the receiving antenna has an accelerometer operably secured thereto 88, there is also provided interferometer 41, seen in FIG. 2, or other measuring device to track the distance between the transmitting and receiving antenna. The detector is operably linked to a plurality of filters 90, and operably linked to a video device 92, For certain important radar platforms e.g. an airplane, the proposed method for dealing with movement of the antennas, namely using an optical interferometer to measure the relative movement will not work for two reasons: firstly, there is no direct line of sight for the light to travel from one antenna to the other; secondly the vibrations can cause changes in transit time in the cables in addition to those caused by the physical movement of the antennas.

Since the rate of change of position is slow, it is possible to use rf transmissions themselves to calibrate the positions continuously in order to stabilize the relative phase shifts. This does require one or more narrow bands in the rf that will not be usable for regular transmissions. However, these bands are so narrow that it is not a problem.

This embodiment of the present invention, provides a system or method that is very similar to the previously discussed methodology except that a second generator, used for calibration, runs continuously at a fixed frequency producing a signal that is combined with the signal from the main generator just after the signals are generated. Two signals are split off the combined signal going up the transmitting antenna. Each of these is run through a voltage controlled, attenuator, and phase shifter to be used as described below. In addition, one of the cables has a narrow band pass filter set to pass the frequency generated by the fixed frequency generator to produce signal S1, while the second one has a blocking-pass filter set to block this calibration frequency to produce a signal S2. The signal coming down the antenna is split, with a small fraction of the power going through a cable with a band-pass filter identical to the one mentioned above. This signal then goes to a detector, D1, after being combined with S1. The remaining signal coming down the receiving antenna is passed through a band-blocking filter identical to the one described above, after which it is combined with S2 and transported to a second detector, D2. Thus, D1 sees only the calibration signal, while D2 does not see this signal, but sees everything else. It is important to choose cables so that the transit times along the paths from the generators to the detectors are the same. The signals S1 and S2 are inverted before they are recombined as above, so that when the signals are combined, since the path differences are zero by design the signals reaching D1 and D2 are nulled.

If relative motion causes the interference at D1 to move away from zero, the phase shifter in the S1 path can be continuously adjusted to maintain the cancellation, given the time scale available. This signal will also not be corrupted by incoming signals because of the filtering and is run continuously. A voltage is also sent to the phase shifter in the path of S2. This voltage is appropriately scaled from the value used on the other phase shifter to take the frequency difference into account. That is, if the frequency of the calibration signal is, for example, 10 Ghz and a 5 Ghz is being transmitted, then the phase of S2 needs to be varied at ½ the rate at which the phase of the calibration signal is changed. The transmitted signal is usually pulse modulated so the bandwidth is not negligible. However, if the overall path lengths are the same, or very close to the same, then it is possible to achieve adequate cancellation for the increased bandwidth.

In operation and use, the disclosed method and apparatus 10, of the present invention may be used in a wide variety of facilities or entities, such as ships, airplanes, vehicles and land based sites that need to transmit and receive radar signals, simultaneously. The present invention is premised on the fact that the facility or entity knows the amplitude and phase of the signals they transmit. Thus if a signal that is derived from the same signal generator 12, or one synchronized with it in both phase and amplitude is taken along a second path to the detector, with the signal taken via the secondary path 15, arriving at the detector 44, with the same amplitude as the signal arising from the primary path 11, but with a phase difference of 180 degrees, so that the two signals sum to zero. The primary path 11, is the path described above, namely through the transmitting and receiving antennas 20, and 32. The secondary path 15, could be through a cable 16, or wave guide, separate antenna, or other means well known in the art, which is fed by diverting some of the signal that goes to the transmitting antenna to the secondary path, and added to the primary signal at a point after the receiving antenna and before the detector. The secondary signal has its amplitude and phase adjusted to cancel the primary signal. This is preferably achieved by voltage controlled attenuator 24, and phase shifter 28. Alternatively the phase can be varied by varying the length of the cable by means of a trombone, a device designed specifically to change the length of a delay line.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A method which enables facilities, such as ships, airplanes, and land based sites, to transmit and receive radar signals to receive any incoming radar signal, while blocking reception of any signals generated by the facility itself, comprising:

transmitting a primary rf signal of frequency f, that is continuous, or modulated by a lower frequency modulation than a carrier frequency f;

relaying said signal to a transmitting antenna where it is transmitted and an unwanted signal is detected by the facilities receiving antenna and transported to a detector;

generating a secondary signal which has the same carrier frequency and modulations as the primary signal and such that the carrier signal maintains a fixed phase relationship with the primary signal, by means of splitting off a fraction of the primary signal before the transmitting antenna, or by generating such a signal from a second rf generator synchronized to said primary signal, in frequency, phase and amplitude; and, relaying said secondary signal through components including a voltage controlled attenuator and a voltage controlled phase shifter, to adjust the amplitude and phase, to a place, at or between the receiving antenna and the detector, where it is added to the primary signal, after its amplitude has been adjusted to equal that of the primary signal, and its phase shifted so it is 180 degrees out of phase with the primary signal at the addition point; the signals will then sum to zero and will not affect the detector, it being crucial that a part of the secondary signal be transmitted by the primary transmission antenna and, if any other antennae be used in the transportation of the secondary beam the radiated secondary signal be contained so as not to interfere with the primary beam anywhere except to the place or the immediate vicinity of the place where the signals are added; the secondary signal is transported using a cable or waveguide and is added in a coupler to the primary signal from the receiving antenna for which, the same transport mechanism is provided between the receiving antenna and the detector.

2. The method of claim 1, wherein if more than one primary signal is transmitted, that is under conditions where a plurality of primary signals with different carrier frequencies are simultaneously transmitted, one secondary signal is provided for each different primary signal transmitted.

3. The method of claim 1, wherein said secondary signal generation is transmitted by said facilities.

4. The method of claim 1, wherein said secondary signal is split off from said primary signal using signal splitting means.

5. The method of claim 1, wherein said secondary signal is generated by a separate generator synchronized in frequency, phase and amplitude with the primary generator.

6. The method of claim 1, wherein said secondary signal is transported so that it only interfere with the primary signal at, or after, the receiving antenna and not interfere in any way with the primary signal at any other location, by using a cable or waveguides.

7. The method of claim 1, wherein said secondary signal is relayed so that it only interferes with the primary signal at, or after, the receiving antenna and not interfere in any way with the primary signal at other locations, by using a secondary antenna positioned in close proximity to the receiving antenna.

8. The method of claim 1, wherein said secondary signal is relayed so that it only interferes with the primary signal at, or after, the receiving antenna and not interfere in any way with the primary signal at other locations, by using a secondary antenna positioned in close proximity to the receiving antenna, and using a shielding mechanism to prevent a radiated signal that could cause interference with the primary signal.

9. The method of claim 1, wherein adjusting the phase is done with said voltage controlled phase shifter.

10. The method of claim 1, wherein the phase is changed by varying the length of the cables using a trombone or by switching in varying lengths of cable using a coaxial switch, and then using the phase shifter to achieve exact cancellation.

11. A method which enables a facility or entity, such as ships, airplanes, and land based sites, that transmit and receive radar signals, to receive any incoming radar signal, while blocking reception of any signals generated by devices in the facility, comprising:

generating a primary signal by an rf generator; said primary signal may be continuous, or modulated by a lower frequency modulation than a carrier frequency f;

transmitting a second signal that is synchronized with the primary signal matching in both phase and amplitude, but with a phase difference of 180 degrees, said second signal travels to a voltage controlled attenuator and to a voltage controlled phase shifter;

combining in a combiner the second signal with a signal radiated by a transmitting antenna and received by a receiving antenna which connects into a transmission enabling mechanism; and, transmitting said combined signal to a detector apparatus.

12. The method of claim 11, wherein said transmission enabling mechanism of said method is a cable.

13. The method of claim 11, wherein said transmission enabling mechanism of said method is a wave guide.

14. The method of claim 11, wherein said transmission enabling mechanism of said method is a secondary antenna.

15. The method of claim 11, wherein said transmitting antenna of said method has an accelerometer operably secured thereto.

16. The method of claim 11, wherein said receiving antenna of said method has an accelerometer operably secured thereto.

17. A method that enables facilities, such as ships, airplanes, and land based sites, which transmit and receive radar signals to receive any incoming radar signal, while blocking reception of any signals generated by the facility itself, comprising:

generating a signal from an rf generator;

splitting said signal, with part of the signal traveling along a primary pathway, and a second part of the signal traveling along a secondary pathway where it goes to a voltage controlled attenuator and to a voltage controlled phase shifter;

combining in a combiner said second part of the signal traveling along said secondary pathway with a signal radiated by a transmitting antenna and received by a receiving antenna that connects into a transmission enabling mechanism; and, relaying said combined signal to a detector apparatus.

18. The method of claim 17, wherein a second generator is utilized for calibration, and runs continuously at a fixed frequency producing a signal that is combined with the signal from said rf generator.

19. The method of claim 17, wherein both of said signals are run through a voltage controlled attenuator and a phase shifter.

* * * * *